United States Patent [19]

Jadus et al.

[11] 4,331,887
[45] May 25, 1982

[54] CURRENT SWITCH DRIVING CIRCUIT ARRANGEMENTS

[75] Inventors: Dale K. Jadus, Putnam Valley; Richard O. Seeger, Wappingers Falls, both of N.Y.

[73] Assignee: International Business Machines Corporation, Armonk, N.Y.

[21] Appl. No.: 162,294

[22] Filed: Jun. 23, 1980

[51] Int. Cl.³ .............................................. H03K 3/26
[52] U.S. Cl. ................................. 307/270; 307/254; 307/255; 307/296 R; 365/16
[58] Field of Search ............. 307/270, 296, 217 A, 307/412, 254, 255; 363/132, 13, 17; 365/242, 16, 517

[56] References Cited

U.S. PATENT DOCUMENTS

| | | | |
|---|---|---|---|
| 3,344,336 | 9/1957 | Moyer | 321/8 |
| 3,753,008 | 8/1973 | Guarnaschelli | 307/270 |
| 3,946,373 | 3/1976 | Moolenbeek et al. | 340/174 TF |
| 3,952,292 | 4/1976 | Komatsu et al. | 340/174 TF |
| 3,959,669 | 5/1976 | Peters | 307/270 |
| 3,971,961 | 7/1976 | Inami et al. | 307/268 |
| 3,972,036 | 7/1976 | Navratil | 340/174 TF |
| 3,972,037 | 7/1976 | Hess et al. | 340/174 TF |
| 3,976,932 | 8/1976 | Collins | 321/45 R |
| 4,042,840 | 8/1977 | Chan | 307/270 |
| 4,106,088 | 8/1978 | Bergan | 363/132 |
| 4,156,210 | 5/1979 | Lipke | 331/114 |
| 4,251,742 | 2/1981 | Beelitz | 307/270 |

*Primary Examiner*—Stanley D. Miller, Jr.
*Assistant Examiner*—B. P. Davis
*Attorney, Agent, or Firm*—George E. Roush

[57] ABSTRACT

This current switch driving circuitry, particularly for, but not necessarily limited to, inductive device current switching, comprises a pair of output transistors constituting a driving transistor for turning ON a subsequent switching transistor and a current sinking transistor for turning OFF that switching transistor with circuit provisions for maintaining the two transistors in a low power consuming standby state. A pair of receiver circuits are arranged for applying ON and OFF logical signals individually to the two transistors by way of intermediate circuitry having current multiplying circuitry for deriving the necessary driving power with a minimum of power consumed.

4 Claims, 3 Drawing Figures

CURRENT SWITCH DRIVING CIRCUIT ARRANGEMENTS

This application relates to the copending U.S. Pat. application Ser. No. 162,293 of Fred Andrew Perner and Lionel Daniel Provazek, filed on the day of June 23, 1980 for "Current Switch Driving Circuit Arrangements" and thereafter allowed Dec. 3, 1981.

FIELD

The invention relates to electric current switch driving circuitry, and it particularly pertains to transistor circuit arrangements for driving current through an inductor useful in part in the production of a rotating magnetic field in a given plane.

BACKGROUND

The generation of current in an inductor by alternating the flow of current through the inductor has been known for decades. Systems operating on this principle have been used for exciting power supply inverting transformers, for operating electric motors, and the like. More recently, such systems have been proposed for exciting the magnetic field coils of bubble type data storage arrangements. For the most part simple switching systems have been used. Because of the waveform requirement primarily, these switching systems have been "brute force" current switch circuit arrangements. Heretofore, the current switch driving circuitry has also followed the "brute force" pattern which has resulted in excessive power drain, slower responding circuitry, and less accurate timing characteristics.

SUMMARY

In accordance with the invention, current switch driving circuitry, particularly for, but not necessarily limited to, inductive device current switching, comprises a pair of output transistors constituting a driving transistor for turning ON a subsequent switching transistor and a current sinking transistor for turning OFF that switching transistor with circuit provisions for maintaining the two transistors in a low power consuming standby state. A pair of receiver circuits are arranged for applying ON and OFF logical signals individually to the two transistors by way of intermediate circuitry having current multiplying circuitry for deriving the necessary driving power with a minimum of power consumed.

PRIOR ART

The applicants are aware of prior art having some component circuitry in common with circuitry according to the invention as shown in the following U.S. patents:

| | | | |
|---|---|---|---|
| 3,344,336 | 9/1957 | Moyer et al | 321/18 |
| 3,946,373 | 3/1976 | Moolenbeek et al | 340/174TF |
| 3,952,292 | 4/1976 | Komatsu et al | 340/174TF |
| 3,972,036 | 7/1976 | Navratil | 340/174TF |
| 3,972,037 | 7/1976 | Hess et al | 340/174TF |
| 3,976,932 | 8/1976 | Collins | 321/45R |
| 4,106,088 | 8/1978 | Bergan | 363/132 |

The patent to Moyer and Brandow is directed to a current switching circuit of the type with which the circuit according to the invention is associated, but which is switched by saturable magnetic core and passive semiconductor device circuitry.

The patent to Moolenbeek and Norlund is directed to a similar current switching circuit in which only the direct current component flows through the inductor and the developed alternating current is confined to a circuit paralleling that inductor.

A magnetic bubble data storage device driver circuit is disclosed by Komatsu and others which generates the desired triangular waveform in response to a square wave central signal for resonant circuits wherein the coils are arranged in quadrature about the storage device.

Navratil discloses a driver circuit for a magnetic bubble data storage device having RC circuits for developing the triangular wave coupled with variable potential sources for obtaining the desired amplitude.

The patent to Hess and Vella-Coleiro discloses a clocked feedback loop circuit arrangement wherein the desired current levels are met with the use of transformers.

A circuit arrangement having complementary driver transistors is shown in the Collins patent, but the application to the driver inductor is different.

Another circuit arrangement having RC circuitry is found in the patent to Bergan.

These patents alone and/or in combination do not suggest the complementary transistor driving and sinking subcircuitry or the current multiplying intermediate stages which make for high efficiency in operation. It is also considered significant that the same driver circuit according to the invention is used for all four drivers in an "H-type" magnetic bubble data storage arrangement wherein complementary operation obtains, which arrangement is not found in the prior art insofar as the applicants are aware.

DRAWING

In order that full advantage of the invention obtain in practice, the best mode embodiment thereof, given by way of example only, is described in detail hereinafter, with reference to the accompanying drawing forming a part of the specification and in which.

DESCRIPTION

Figure 1:
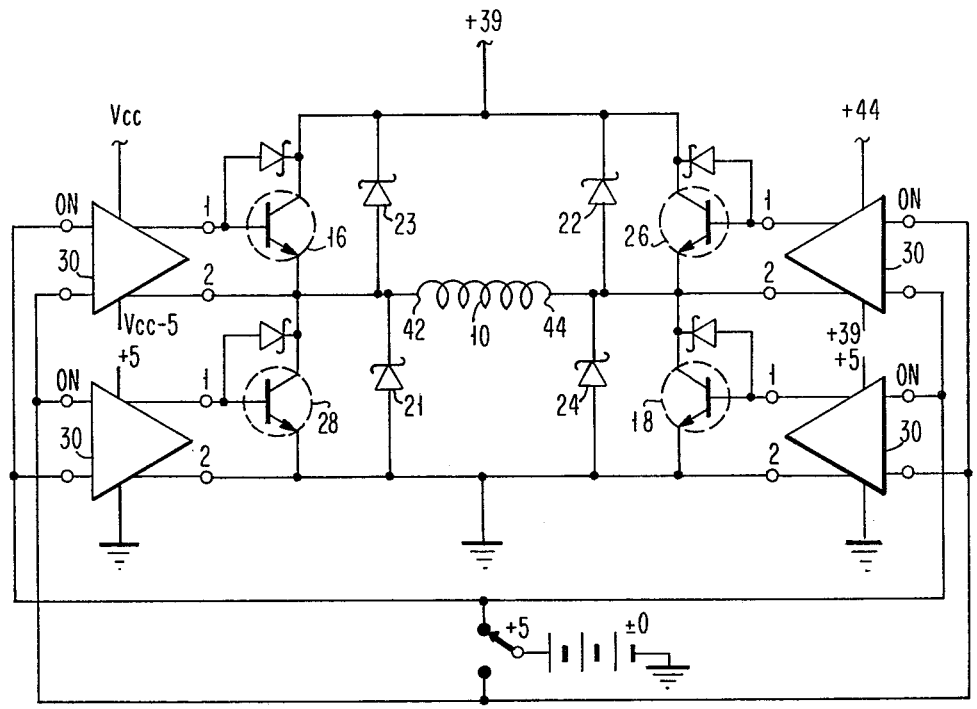
FIG. 1 is a schematic diagram of a magnetic bubble data storage device incorporating circuitry according to the invention.

FIG. 1 illustrates the driving circuit according to the invention in the environment in which it is designed to operate. In this circuit arrangement, which is but one example of circuitry involving the driving circuitry according to the invention, an inductor 10 is arranged for producing a desired magnetic field. For example, one such inductor is arranged as a primary winding of a dc-ac power inverter. Another example, two such inductors arranged with their longitudinal axes perpendicular to each other and superimposed, and driven respectively by in-phase and 90° out-of-phase currents, are used for producing a rotating magnetic field in the plane defined by the two axes, and in which plane a bubble type data storage chip is placed, constitutes a prime application of the circuitry according to the invention. The circuit arrangement shown is duplicated in such applications. The necessary in-phase and out-of-phase currents for the inductors are provided by switching current through the inductor in an alternating fashion.

Electric current is switched from a +39 volt energizing potential supply node, through a switching transistor 16, through the inductor 10 and through another switching transistor 18 to the other node, shown here at ground reference potential of the 39 volt energizing potential supply. Schottkey diode devices 21, 22, 23 and 24 are arranged individually across the switching transistors for purposes to be discussed hereinafter. Similarly, the electric current is made to flow through the inductor 10 in the opposite direction by way of switching transistors 26 and 28. The switching is controlled by switch driving circuits 30; these circuits according to the invention are substantially identical whereby a single reference numeral, 30, is used for all.

Figure 2:
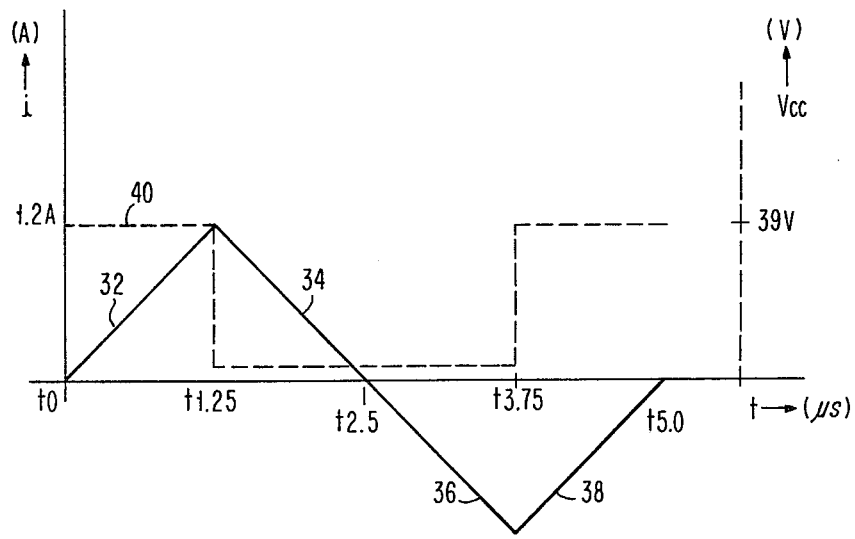
FIG. 2 is a graphical representation of waveforms useful in an understanding of the circuitry according to the invention.

The operation of the circuit arrangement as thus described, is represented graphically by the curves in FIG. 2. At time $t_0$, the switch transistors 16, 18 begin conducting and the current rises as shown by the portion 32 of the curve which rises to the maximum value at time $t_{1.25}$ microseconds later. At this time the switching transistors are turned off and the next portion 34 of the curve is generated by the decay of current through the passive action of Schottky diode devices 21 and 22. The following portion 36 is generated by turning on switching transistors 26 and 28 and the final quarter cycle portion 38 is generated by the passive action of Schottky diode devices 23 and 24. The dash line curve 40 is a graphical representation of the potential at one terminal node 42 of the inductor 10. The square wave potential at the other terminal node 44 is simply the inverse of the curve 40. Due to the reactance of the inductor 10, a triangular current wave is generated. Two such triangular waves in quadrature, generated as heretofore described, provide the desired rotating magnetic field.

Figure 3:
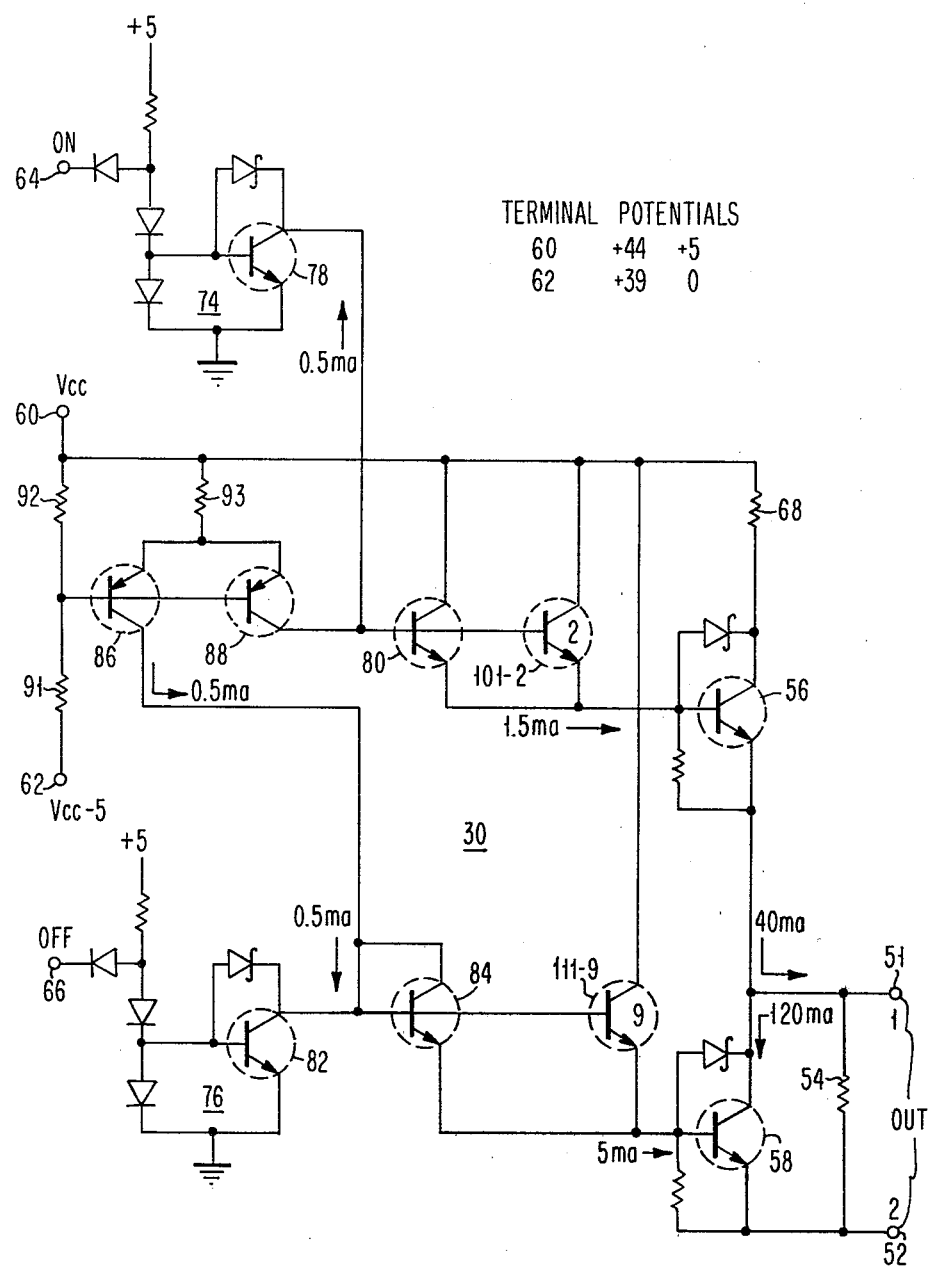
FIG. 3 is a schematic diagram of a magnetic bubble data storage device incorporating circuitry according to the invention.

A schematic diagram of one current switch driving circuit 30 is shown in FIG. 3.

The base electrode and the emitter electrode of a switching transistor, 16 for example, are connected respectively to the output terminals 51, 52 of the driver circuit. Bias for the discrete switching transistor is applied through a resistor 54 which is a part of the integrated circuitry as shown here. Driver output transistors comprise a driving transistor 56 and a sinking transistor 58. These transistors are connected in series from a point of energizing potential at terminal 60 to the terminal 52 as shown with the output terminal 51 connected directly to the junction between the two output transistors 56, 58. In operation the driving transistor 56 is rendered conducting by the application of ON logical signal at a terminal 64 and turned off again by the application of OFF logical signal at a terminal 66. Should both terminals 64, 66 be DOWN the short circuit conducting condition of the transistors 56 and 58 draw only a safe level of current due to the interposition of a current limiting resistor 68 in the series circuit between the power terminal 60 and the output terminal 52.

It is an object of the invention that a low power consuming standby mode of operation obtains when both terminals 64, 66 are at the UP logical signal level. This is brought about in the intermediate circuitry comprising logical signal receiving circuits 74 and 76 which are current mode receiving circuits which also serve in regulating current steering between controlling transistors 78 and 80 and 82 and 84. Schottky diode devices are arranged for fast operating characteristics. Current source transistors 86 and 88 are arranged in conjunction with resistors 91, 92 and 93 for applying 0.5 milliampere currents to the controlling transistors. Five volts is always maintained across the divider resistors 91, 92 whether the terminal 62 is at +30 volts or at ground potential. These p-n-p current source transistors 86, 88 compensate for the inductive kicks at the terminals of the inductor.

For the current multiplying function, a number of transistors of the same characteristics as others elsewhere in the circuit chip are connected in parallel. These are shown here as a single transistor with a multiplying numeral close by. The transistor 101-2 therefore has the numeral 2 indicating that for the example specifically shown, two transistors are paralleled for twice the current and the transistor 111-9 therefore has nine transistors connected in parallel.

When the ON logical signal at the terminal 64 is at the DOWN, or ground level the current from the source transistor 88 will flow through the transistor 80, be multiplied in effect by the transistor 101-2 and flow into the driver transistor 56 and out of the output terminal 51 (to the base of the switch transistor in FIG. 1). During this time the OFF logical signal at the terminal 66 is at the UP level, or +5 volts, allowing a low value of current from the source transistor 86 to flow into receiver transistor 82; the transistors 84, 111-9 and 58 are thereby turned off.

With the logical signal levels reversed, the driving transistor 56 will be blocked and the sinking transistor 58 will conduct. In so conducting the transistor 58 will draw a relatively large current for a short portion of the cycle time due to the relatively large base-emitter capacitance of the associated switching transistor, and eventually turn it off.

The current switch driving circuitry as shown in the drawing operates as shown in the table below.

| OPERATION | | | | |
|---|---|---|---|---|
| Node | | Transistors | | |
| 64 | 66 | 78 | 82 | Others |
| HI (5.0v)* | HI (5.0v)* | ON | ON | STANDBY STATE: 78 and 82 ON; 80, 102-2, 56, 84, 111-9, 58 OFF |
| LO (0.5v)* | HI (5.0v)* | OFF | ON | 80, 101-2, 56, 82 ON current is supplied to output terminal 51; 84, 111-9 and 58 OFF |
| HI | LO | | | 84, 111-9, 58 and 78 ON; current flows out of terminal 51; 80, 101-2 and 56, 82 OFF |
| LO | LO | | | INVALID STATE: Resistor 68 will limit the "short circuit" current should nodes 64, 66 accidentally be LO simultaneously. |

*Nominal values TTL Logical Family characteristics

While the invention has been described in terms of an express embodiment, and alternatives have been suggested, it should be recognized that those skilled in the art will suggest other changes without departing from the spirit and scope of the invention as defined in the appended claims.

The invention claimed is:

1. Current switch driving circuitry, comprising
one logical signal receiving circuit having an input terminal at which ON logical signal is applied and having an output terminal,
another logical signal receiving circuit having an input terminal at which OFF logical signal is applied and having an output terminal,
an output circuit comprising
a driving transistor and a sinking transistor having the collector-emitter electron flow paths thereof connected in series and having output circuit input terminals individually connected to the base electrodes of said transistors, and
output terminals connected individually to the collector electrode and the emitter electrode of said sinking transistor,
current multiplying circuitry connected between said one logical signal receiving circuit and the base electrode of said driving transistor for actuating the latter during a desired time period,
current multiplying circuitry connected between said other logical signal receiving circuit and the base electrode of said sinking transistor for actuating the latter during another time period, and
a dissipating resistance element interposed in circuit with said collector electrode of said output driving transistor for protecting said transistors from excessive current flow in the event that both receiving circuits are at the DOWN logical level.

2. Current switch driving circuitry as defined in claim 1, and incorporating
a switching transistor having an emitter electrode connected to one of said output terminals and a base electrode connected to the other of said output terminals, and a collector electrode, and
an inductor having one terminal connected to the emitter electrode of said switching transistor, and
circuitry for applying energizing potential between the other terminal of said inductor and said collector electrode of said switching transistor.

3. Current switch driving circuitry, comprising
input terminals,
output terminals,
an output current sinking transistor having emitter and collector electrodes individually connected to said output terminals and having a base electrode,
an output driving transistor having an emitter electrode connected to said collector electrode of said output sinking transistor, having a collector electrode connected to a point of fixed potential and having a base electrode,
one logical signal receiver circuit for responding to ON logical signal having the input thereof connected to one of said input terminals and having an output transistor,
another logical signal receiver circuit for responding to OFF logical signal having the input thereof connected to the other of said input terminals and having an output transistor, and
current multiplying circuitry intermediate said output transistor of said other receiver circuit and said base electrode of said driving transistor,
current multiplying circuitry intermediate said output transistor of said one receiver circuit and said base electrode of said sinking transistor,
said current multiplying circuitry comprising
a plurality of transistors having like electrodes connected in parallel with the emitter electrodes connected to said base electrode of said output current transistors, the collector electrodes maintained at a fixed potential, and
a control semiconductor device connected to the corresponding receiver output transistor and to the base electrodes of said parallel connected transistors.

4. Current switch driving circuitry, comprising
input terminals at which logical ON and logical OFF signals are applied,
output terminals at which an electric component to be driven is connected,
an output current sinking transistor having emitter and collector electrodes individually connected to said output terminals and having a base electrode,
an output driving transistor having an emitter electrode connected to said collector electrode of said output sinking transistor, having a collector electrode and a base electrode,
one current multiplying circuit having a plurality of current transistors all having emitter electrodes connected in common to said base electrode of said driving transistor, having collector electrodes connected in common to a point of fixed energizing potential and having base electrodes connected in common,
another current multiplying circuit having a control transistor and a multiple of current transistors all having emitter electrodes connected in common to said base electrode of said sinking transistor, having collector electrodes connected in common to a point of fixed energizing potential and having base electrodes connected in common,
one logical signal responsive circuit having a transistor with a base electrode coupled to the OFF input terminal, an emitter electrode connected to a point of fixed reference potential and having a collector electrode connected to said base electrode of said diode connected control transistor,
another logical signal responsive circuit having a transistor with a base electrode coupled to the ON input terminal, an emitter electrode connected to a point of fixed reference potential and having a collector electrode connected base electrode of said other control transistor, and
current sourcing circuitry connected to said collector electrode of said logical signal responsive circuits.

* * * * *